No. 795,767. PATENTED JULY 25, 1905.
J. H. HERSHBERGER.
VEHICLE WHEEL.
APPLICATION FILED JULY 26, 1904.
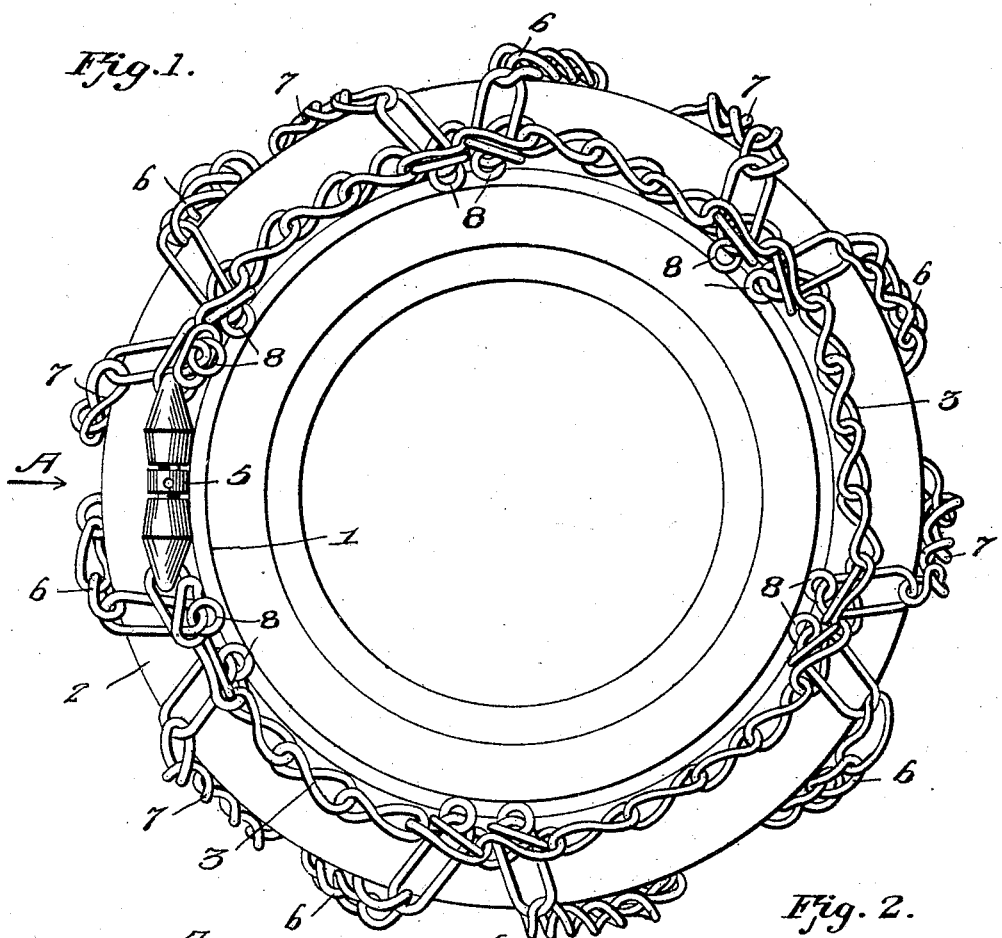
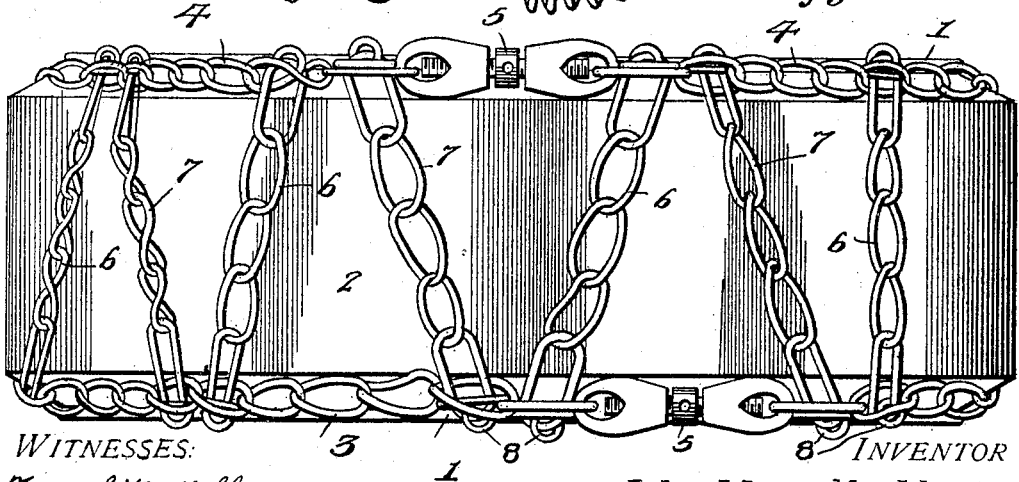
WITNESSES: Frank B. Hoffman.
INVENTOR John Henry Hershberger.
BY Victor J. Evans, Attorney

UNITED STATES PATENT OFFICE.

JOHN H. HERSHBERGER, OF WILKESBARRE, PENNSYLVANIA.

VEHICLE-WHEEL.

No. 795,767.  Specification of Letters Patent.  Patented July 25, 1905.

Application filed July 26, 1904. Serial No. 218,255.

*To all whom it may concern:*

Be it known that I, JOHN HENRY HERSHBERGER, a citizen of the United States, residing at Wilkesbarre, in the county of Luzerne and State of Pennsylvania, have invented new and useful Improvements in Vehicle-Wheels, of which the following is a specification.

This invention relates to a vehicle-wheel provided with a soft tire—such as rubber, either solid, cushioned, or inflatable—and consists of an armor for the tire to protect it from injury and cause it to take a better grip or increase its frictional contact on road-beds, whereby a vehicle provided with such armored wheels is prevented from slipping or "skidding" on soft or smooth roads when turning or increasing or reducing speed.

The invention comprises an endless chain on each side of a tire, to which are connected other chains passing over the tread of said tire, the novel construction and arrangement of the several parts being illustrated by the accompanying drawings, described in the specification, and particularly pointed out in the claims.

In the accompanying drawings, Figure 1 is a side view of an automobile-wheel with the improved armor applied to the tire thereof, the hub and spokes being omitted. Fig. 2 is a view of the same looking in the direction of the arrow A, Fig. 1.

Similar numerals of reference indicate corresponding parts in both the figures.

The numeral 1 indicates a wheel-rim, which may be of any size and made of wood, metal, or other suitable material, around which is a flexible tire 2. The rim and tire may each consist of any one of the well-known varieties found in common use at the present day.

The numeral 3 indicates a chain having its ends joined by a right and left screw-coupling 5, by lengthening or shortening which the chain can be made to fit snugly around the edge of the rim 1 close to its junction with the tire 2, as will be seen on reference to Fig. 1. A similar chain 4 encircles the opposite side of the rim and in similar relation to the tire.

A number of short chains 6, substantially parallel to one another, extend diagonally across the tread of the wheel and have their ends fastened to the side chains 3 and 4. Between the cross-chains 6 are placed similar chains 7, but at an angle opposite that of the chains 6. The chains 7, as also those 6, are fastened to the side chains 3 and 4 by pressing the end links of the angularly-disposed cross-chains through links of the side chain, and after fitting a washer or other similar device around each end link open rings 8 are placed on said end links and closed, thereby holding the chains 6 and 7 firmly secured to the chains 3 and 4.

The several chains are so proportioned to one another that the circular chains 3 and 4 are held securely in place, while the cross-chains 6 and 7 are drawn tightly across the tread or periphery of the tire. After the chains 6 and 7 have been fastened in place, the couplings 5, if found necessary, may be lengthened or shortened to secure a better fit for the armor.

It is to be understood that while the cross-chains 6 and 7 are hereinabove referred to as "independent" sections, a single chain may be employed for the purpose by passing it back and forth across the tire, one link of the chain at the turns being fastened to each circular or side chain.

Having thus described the invention, what is claimed as new is—

1. An armor for wheel-tires comprising circular chains, cross-chains connected to said circular chains, the end links of the cross-chains passing through links of the circular chains, and means engaged with each end link of the cross-chains to hold the same in engagement with the links of the circular chains.

2. An armor for wheel-tires comprising circular chains, cross-chains connected to said circular chains, the end links of the cross-chains passing through links of the circular chains, and separable rings placed in each end link of the cross-chains to hold the same in engagement with the links of the circular chains.

In testimony whereof I affix my signature in presence of two witnesses.

JOHN H. HERSHBERGER.

Witnesses:
J. L. CAREY,
HARRY HERSHBERGER.